E. A. SPERRY.
AUTOMATIC PILOT FOR AEROPLANES.
APPLICATION FILED NOV. 19, 1918.

Patented June 6, 1922.

INVENTOR
Elmer A. Sperry.
BY Herbert H. Thompson
his ATTORNEY

E. A. SPERRY.
AUTOMATIC PILOT FOR AEROPLANES.
APPLICATION FILED NOV. 19, 1918.
1,418,335.
Patented June 6, 1922.
3 SHEETS—SHEET 2.
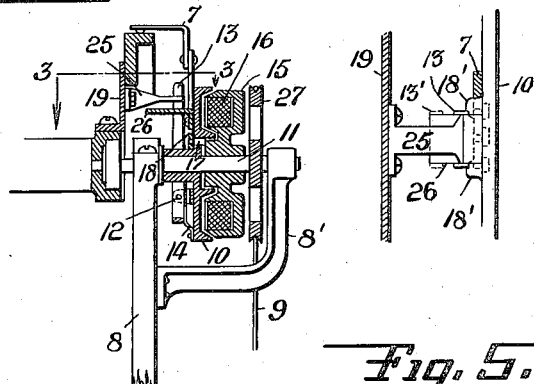
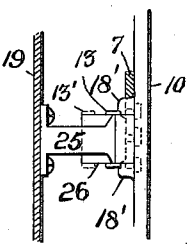
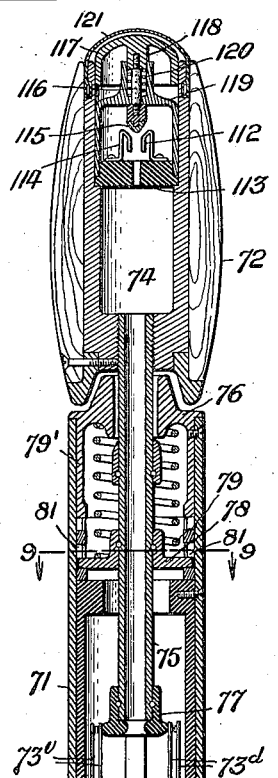
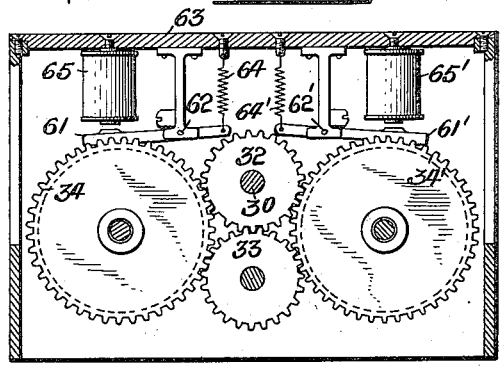
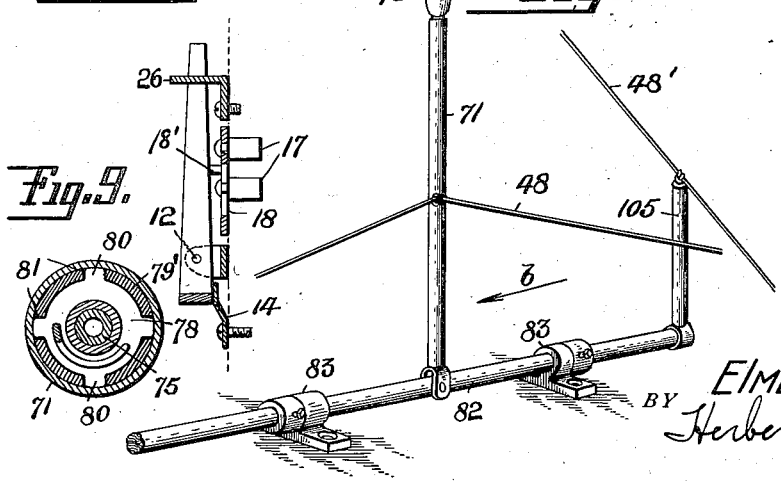
INVENTOR
Elmer A. Sperry.
BY Herbert H. Thompson
his ATTORNEY

UNITED STATES PATENT OFFICE.

ELMER A. SPERRY, OF BROOKLYN, NEW YORK.

AUTOMATIC PILOT FOR AEROPLANES.

1,418,335.  Specification of Letters Patent.  Patented June 6, 1922.

Application filed November 19, 1918. Serial No. 263,217.

*To all whom it may concern:*

Be it known that I, ELMER A. SPERRY, a citizen of the United States of America, residing at 1505 Albermarle Road, Brooklyn, in the county of Kings and State of New York, have invented certain new and useful Improvements in Automatic Pilots for Aeroplanes, of which the following is a specification.

This invention relates to the control of aeroplanes and aims to effect various improvements in the systems disclosed in the following applications for United States Letters Patent now matured into the following U. S. Letters Patent, Elmer A. Sperry, 1,368,-226, Feb. 8th, 1921, applied for July 17th, 1914, aeroplane stabilizer; Lawrence B. Sperry, 1,324,134, December 9th, 1919, mechanical pilot for aeroplanes, filed April 24th, 1916, and application, Serial Number 87,434 of Lawrence B. Sperry, filed March 29th, 1916, automatic pilot for aeroplanes.

Besides simplifying and increasing the flexibility and reliability of such systems the invention has for its aim to supply certain features and instrumentalities lacking in the prior systems, as will be apparent on reading the following disclosure.

Referring to the drawings which illustrate two forms the invention may assume:

Fig. 2 is a section of a constructional detail of the gyroscopic unit employed in the system.

Fig. 3 is a sectional detail taken on the line 3—3 of Fig. 2.

Fig. 4 is an enlarged detail of a position of the structure shown in Fig. 2.

Fig. 5 is a sectional elevation of a part of the servo-motor shown diagrammatically in Fig. 1.

Fig. 6 is a detail sectional elevation of one form of manual control lever.

Fig. 7 is a detail perspective illustrating certain of the connections to said lever.

Fig. 9 is a section on the line 9—9 of Fig. 6.

Figure 1:
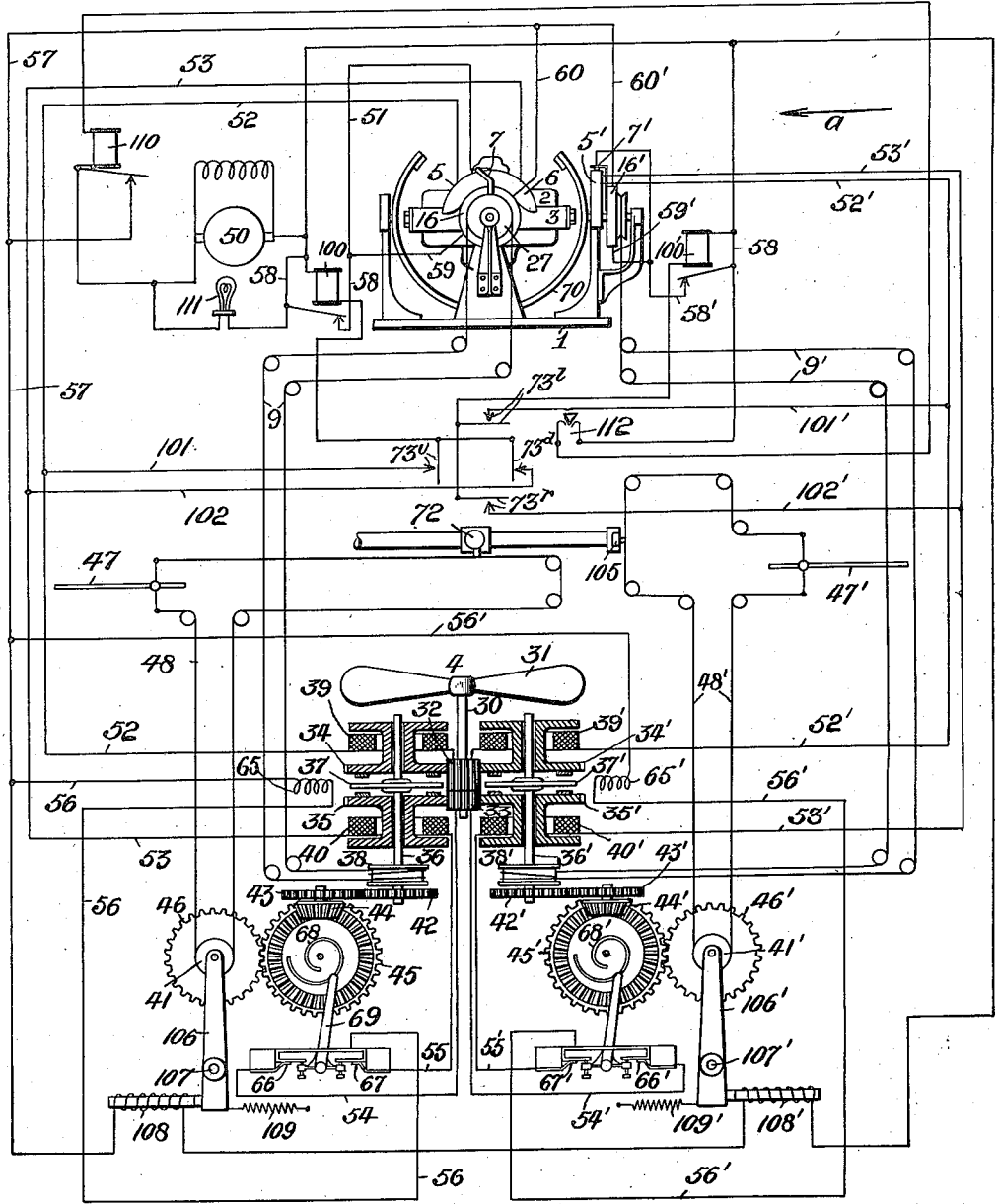
Fig. 1 is a diagrammatic development of one of the systems of control.

Referring to Fig. 1, a master governor for controlling the stability of the aeroplane is shown at 1 and consists in this instance of a gyroscope 2 mounted on a vertical spinning axis within the usual gimbal ring 3. Contacts for controlling the servo-motor 4 are arranged about each horizontal axis of the governor 1. Thus a pair of segmental contact strips 5, 6 are mounted on, or connected to, the ring 3 and a brush 7 therefor is carried by a relatively fixed portion of the aeroplane.

Means are preferably provided whereby the brush 7 may receive a follow-up movement from the particular control plane or planes governed by the said brush and its cooperating contacts 5, 6. Means are also preferably provided for breaking this follow-up connection and for centralizing said brush 7 with respect to the segments 5, 6 and for securing the brush thereto. One form of such means is illustrated in Figs. 1, 2, 3, and 4 and may be constructed substantially as follows.

The brush 7 is mounted on a member 10 loosely mounted on the shaft 11 journaled in the brackets 8, 8'. Pivoted at 12 on one face of member 10 is a U-shaped spring 13, the free ends of which are normally pressed toward said member by a spring 14. An electro-magnetic clutch member 15 is secured on shaft 11 against axial movement adjacent member 10, so that upon energization of the winding 16 member 10 will be drawn toward magnet 15. A plurality of pins 17 project from a plate 18 through holes in member 10 and bear against the hub of clutch magnet 15. The plate 18 is provided with flanges 18' adapted to bear against the two legs of the spring. It will thus be seen that the energization of winding 16 will not only couple members 10 and 15 together, but will move the free ends of spring 13 away from both members, since the points of contact between the spring and plate 18 will remain stationary, and pivot 12 will move with member 10. Projecting from the support 19 of contact segments 5, 6 is a T-shaped plate 25. When the clutch is released the plate is positioned as shown in Fig. 3, the plate fitting snugly between the ends of spring 13, but when the clutch parts are in engagement the ends are thrown back as shown at 13' in Fig. 3 so that a limited play is allowed between the stem of plate 25 and the spring. A plate 26, of about the width of the broadest portion of the plate 25, holds the two legs apart. The follow-up wire 9 passes around a pulley or drum 27 secured to the shaft 11.

When the winding 16 is energized the members 10 and 15 are locked together and the brush 7 is positioned by the follow-up wire 9. When said magnet is deenergized the member 10 is released and moved back under the influence of the spring 14 acting against plate 18 through the spring 13. The purpose of the spring 13 and its associated parts is to centralize the brush 7 with respect to contacts 5, 6. When the clutch is engaged, the brush moves with member 15 and should have no mechanical connection with the sensitive gyroscope, but when the clutch is released, preparatory to resetting the members, I find it desirable that the brush be brought to the neutral positions between the contacts 5, 6. The spring 13 automatically accomplishes both of these results, since the ends closely engage the T end of plate 25, when the clutch is released, while when it is closed the spring is moved away from said end as explained.

Various types of suitable servo-motors are known in the art, among which are the pneumatic type, the electro-dynamic type, and the wind-driven type. The servo-motor 4 of Fig. 1 is of the last mentioned type and is constructed substantially as follows.

A shaft 30 is constantly driven by a wind motor 31 and drives two intermeshing pinions 32, 33 in opposite directions (see Figs. 1 and 5). One of these pinions drives gears 34, 34' while the other drives gears 35, 35'. Gears 34 and 35 are loosely mounted on shaft 36, while gears 34' and 35' are loosely mounted on shaft 36'. Clutch discs 37, 37' and drums 38, 38' are secured respectively to shafts 36, 36'. The gears 34, 34', 35, 35' are each adapted to be moved into engagement with a corresponding clutch disc to drive the latter upon energization of a corresponding clutch magnet 39, 39', 40 or 40'. The shaft 36 is operatively connected to a drum 41 through a train of gearing 42, 43, 44, 45, 46 said drum being connected to a control plane such as the elevating rudder 47 of the aeroplane. This connection may assume the form of a wire or cable 48. The shaft 36' is similarly connected to the ailerons or longitudinal control planes, one of which is shown at 47', by similar connections 42' to 48'. The drums 38 and 38' actuate the follow-up connections 9 and 9' respectively.

As the contacts 5, 6 are stabilized about the transverse horizontal axis of the aeroplane (the direction of flight being indicated by the arrow A) they may be employed to control coils 39, 40 and thereby the rudder 47 to maintain the aeroplane stable in any predetermined position about said axis. One form of connections for accomplishing this result is illustrated in Fig. 1. The brush 7 is connected by means of conductor 51 to a generator or other source of E. M. F. 50 and the contacts 5, 6 are connected respectively to the coils 39, 40 by means of conductors 52, 53. The other ends of said coils are connected to a common return conductor 56 by means of conductors 54, 55 and said common return is connected to the line wire 57 connected to the other terminal of the generator. Obviously any rotation or movement of the aeroplane from its predetermined position about the transverse axis will cause energization of one or the other of clutch magnets 39 or 40 thereby causing movement of the rudder 47 to return the aeroplane to its predetermined position about said axis. It is to be understood, of course, that the clutch magnet 16 is normally energized through conductors 58, 59, 60, and 57 so that the brush 7 is normally locked to pulley 27.

In order to prevent disarrangement of the follow-up connections by gusts of air blowing on the rudder 47 when the coils 39 and 40 are deenergized I provide the disc 37 with a brake adapted to prevent rotation thereof unless one or the other of said coils is energized. One form of such brake is illustrated in Fig. 5 and comprises a lever 61 pivotally connected at 62 to the frame 63 of the servo-motor 4 and biased to frictional engagement with the disc 37 by a spring 64. An electro-magnet 65 is secured to the frame 63 in a position to attract the lever 61 to move the latter from its locking or braking position when said electro-magnet is energized. The latter is connected in the common return 56 so that when either of coils 39, 40 is energized the brake is released.

The servo-motor is also preferably provided with limit switches adapted to prevent movement of the rudder beyond a predetermined amount. One form of such switches is shown in Fig. 1 in which two normally closed switches 66, 67 are shown inserted respectively in the connections 54, 55 of the coils 39 and 40. Each of these switches is adapted to be opened when the servo-motor shaft 36 has rotated a predetermined amount in a corresponding direction. Thus the gear 45 is provided with a spiral slot 68 which moves the lever 69 to break one or the other of the circuits of coils 39 and 40 when the limit of motion of the control rudder is reached.

The stabilization of the aeroplane about the longitudinal axis is effected in a manner and by means similar to that about the transverse axis, corresponding parts and elements being designated by the same reference numerals with a prime added. It should be noted that the contacts, which correspond to contacts 5, 6 and one of which is indicated at 5' are secured to the bail 70 of the gyro control unit instead of to a gimbal ring.

Means are also provided whereby the servo-motor 4 may be manually controlled to cause the aeroplane to rise or descend or to bank in either direction, the control of the gyro unit being automatically rendered ineffective while this manual control is being effected and automatically reestablished to maintain the aeroplane in its new position. By manual control I mean control effected from any part of the operator's body and while such control is herein disclosed as effected by the hand of the operator, such disclosure is merely illustrative of one type of control from the operator's body. While two or more manually operable members may be employed to effect this control I have devised a system whereby a single manually operable member may be utilized to change the elevation or to bank the machine or both. To understand the operation of these features of my invention reference should be made to Figs. 6 and 7 as well as Fig. 1.

A lever 71 is universally mounted and is adapted to control a plurality of switches in turn adapted to control the servo motor 4. As will appear later in the disclosure I prefer to utilize this same lever to actuate the control planes 47, 47' directly. The lever 71 is shown in the form of a hollow rod or sleeve in which a sleeve 73 of insulation is secured. The latter carries four sets of resilient contacts 73$^u$, 73$^d$, 73$^r$, and 73$^l$ of which three sets are shown in Fig. 6. These contacts are spaced 90° apart, are insulated from each other and are biased to open position. The handle 72 is provided with an interior sleeve 74 to which a downwardly extending hollow stem 75 is detachably secured. The latter extends downwardly through an opening in a cap 76, secured to lever 71, and carries at its lower end a sleeve 77 of insulation normally in engagement with and adapted to operate the inner contacts. In order to assist the last mentioned contacts in returning the stem 75 to normal or central position the latter has secured thereto a disc 78, between which disc and the cap 76 a compression spring 79 is mounted. The disc 78, as clearly shown in Fig. 9, is provided with four projections or lugs 80 which enter vertical slots 81 provided in a sleeve 79'. The latter is gripped and held between the sleeve 73 and cap 76 and its slots are so designed as to permit sufficient lost motion between the handle 72 and lever 71 to close one or two of the sets of contacts.

The lever 71 is shown pivoted at its lower end to a rock shaft 82 rotatably but non-slidably mounted in bearings 83 secured to the aeroplane in such a manner that the axis of said shaft is fore and aft. Assuming that the arrow $b$ in Fig. 7 represents the direction of flight it will be readily understood that by pulling the handle 72 rearwardly contacts 73$^u$ will be closed. Similarly by moving the handle forward or to the right or left the contacts 73$^d$, 73$^r$ or 73$^l$ will be closed. It should also be noted that any two of the sets of contacts may be closed by moving the handle in a direction between any two of the above named directions.

Referring to Fig. 1 it will be seen that one of the contacts 73$^u$ is connected to one of the contacts 73$^d$ and through a relay 100, to the side of generator 50 to which conductor 58 is connected. The others of contacts 73$^u$ and 73$^d$ are connected respectively to the conductors 52, 53 by means of conductors 101, 102. It will be noted that the armature of relay 100 and the back contact thereof are connected in the conductor so that on energization of said relay the contact 7 of the gyro unit and clutch magnet 16 are disconnected from the line and the gyro unit thereby rendered ineffective to control the aeroplane about the transverse axis.

The operation of this part of my invention may best be understood by assuming that it is desired to cause the aeroplane to climb. The handle 72 is pulled rearwardly closing contacts 73$^u$ to complete the following circuit, starting from generator 50 through relay 100 contacts 73$^u$, conductors 101, 52, coil 39, conductor 54 limit switch 66, conductor 56, brake magnet 65, conductor 57 to the other side of said generator. Energization of relay 100 causes deenergization of magnet 16. As previously explained deenergization of magnet 16 causes contact 7 to centralize with respect to contacts 5 and 6 and to be held in this position until the magnet is re-energized. The contact 7 is also disconnected from the generator by energization of said relay 100. The aeroplane will now travel upwardly so long as contacts 73$^u$ are held closed. As soon as the handle 72 is permitted to assume normal or central position with respect to lever 71 the relay 100 is deenergized and the gyro contacts 5, 6, 7 again assume control of the aeroplane. It should be noted, however, that as the contact 7 was held fixed with respect to contacts 5 and 6 while the aeroplane was moved about the transverse axis these contacts will maintain the machine in the same position with respect to the said axis in which it was left on opening of contacts 73$^u$. The operation to cause the aeroplane to descend is so similar as to require no description.

The contacts 73$^r$ and 73$^l$ are connected to a relay 100' and wires 52', 53' in a manner similar to the way in which contacts 73$^u$ and 73$^d$ are connected and the operation will be readily understood.

Under certain conditions, as for example upon failure of the source of E. M. F. of the system or on failure of the pressure if a fluid operated servo-motor is employed, it is desirable to operate the control planes manually and directly. For this purpose the cable 48 of the control plane 47 may be connected to the lever 71, as shown in Fig. 7, and the cable 48' to an arm 105 on the rock shaft 82. In order to avoid the necessity of operating the servo-motors and gearing when the direct manual control is resorted to due to failure of the source I prefer to provide means for automatically disconnecting the servo motors from their control planes when such failure occurs. One form of such means is illustrated in Fig. 1 and may be constructed substantially as follows.

The gear 46 and its drum 41 are rotatably mounted on the outer end of a lever 106 pivotally mounted at 107. An electro-magnet 108 is adapted when energized, to hold the gear 46 in mesh with gear 45 against the action of a spring 109. Similar elements 106' to 109' are provided for gear 46'. The solenoids 108, 108' are connected in series with each other across the generator 50. On failure of the latter the solenoids 108, 108' will be deenergized and the gears 46, 46' thrown out of mesh with gears 45, 45'. The planes 47, 47' may then be readily operated directly by the lever 71 through connections 48, 48' without operating the servo-motors as a load. A pilot lamp or other indicator 111 may be connected across the generator 50 and located in any position within the range of view of the pilot to notify the latter when failure of the source occurs and when the E. M. F. is reestablished. As soon as the E. M. F. is reestablished the gyro unit assumes control and the pilot is notified by the pilot light.

Under certain conditions it may be desirable to utilize the direct manual operation of the control planes 47, 47' even though the source 50 has not failed. This may be accomplished by closing the normally open switch 112 which is in series with the winding of a relay 110 across the generator 50. The back contacts of the last mentioned relay are connected in one of the main line wires of the generator 50 so that on closure of said switch 112 it is impossible to energize any part of the system except pilot lamp 111 and said relay 110. The planes may then be operated readily by hand and directly. If it is desired to cause the gyro unit to assume control again it is necessary only to open the switch 112 when the aeroplane will be held in the new position. The switch 112 may be located in any convenient position but is preferably located on the handle 72 as shown in Fig. 6.

The sleeve 74 is counterbored to form a seat for a block of insulation 113 which carries the fixed contacts 114 of said switch 112. These contacts are adapted to be bridged by a contact 115 secured to but insulated from a rod 116 secured at its opposite end to a cap 117 slidably mounted in the sleeve 74. The cap 117 is provided with a downwardly extending boss 118 slidable in a bore provided in a guide member 119 mounted in said sleeve 74. The contact 115 is biased away from contacts 114 by means of a spring 120 between cap 117 and guide member 119. Preferably a cover 121 of flexible material, such as rubber, is secured over the cap 117 by being gripped between the grip of the handle and the sleeve 74 in a groove provided in the latter. It will be noted that the conducting wires from contacts 114 may be brought down through sleeve 74, stem 75 and together with the leads from contacts $73^u$, $73^d$, $73^r$ and $73^l$ through the lever 71.

The operation of the system as thus far described may be summarized as follows. Assume that the aeroplane is flying on an even keel, i. e., that both the transverse and longitudinal axes are horizontal. The machine will be held in this position by the gyro unit operating through the servo-motors. If it is desired to cause the machine to ascend, or descend, or to bank right or left or tilt about both axes it is necessary only to move the handle 72 in the proper direction to close one or more of the switches $73^u$, $73^d$, $73^r$ or $73^l$. Closure of one or more of these switches cuts out the control by the gyro unit, causes centralization of contacts 7, 7' with respect to contacts 5, 6 and 5', 6' and energizes one or more of the servo-motor coils to cause the aeroplane to move in the direction desired. By releasing the handle 72 to allow it to centralize with respect to lever 71 the gyro unit again resumes control and will maintain the plane in the new position. If the source of energy 50 should fail the pilot is immediately apprised of this fact by the indicator 111 and the gears 46, 46' are thrown away from the gears 45, 45' by the springs 109, 109'. The pilot may then assume control of the planes 47, 47' by direct manual operation without operating the servo-motors as an idle load. If the source 50 should be reestablished the gyro unit automatically assumes control and the operator learns of this fact by the signal or indication given at 111. The pilot may assume direct manual control at any time by depressing the top of handle 72 with his thumb or hand to close switch 112 which causes the gyro unit to be cut out of control and the gears 46, 46' to be thrown out of mesh with gears 45, 45'. The plane may then be moved to any desired position about the horizontal axes and by releasing the switch 112 the gyro unit will again assume control to hold the machine in the new position.

In the application of Lawrence B. Sperry, No. 93,078, above referred to, which application has now matured into Patent No. 1,324,134, issued December 9, 1919, there is shown means operated by a manual control lever, for centralizing a contact carried by the aeroplane with respect to the cooperating gyro-stabilized contacts to place the automatic stabilizer out of control when said manual lever is actuated to move a control plane directly. However, no means operated by said control lever is shown for centralizing said contact when the lever is moved to actuate the plane through the servo-motor. In my present control system, it will be seen that I have provided means operated by movement of the manual control lever for centralizing the said contact when said lever is actuated to operate a control plane through the servo-motor. Consequently in my system, when it is desired to have the gyro stabilizer maintain the aircraft in a new position it is merely necessary to move the control lever to operate the control plane through the servo-motor and upon release of said lever the gyro stabilizer will assume control and will hold the aircraft in its new position, whereas, in the system disclosed in the aforesaid patent to L. B. Sperry, the control plane must be operated directly by the manual control member instead of through the servo-motor when it is desired to have the gyro stabilizer keep the aircraft in a new position. Furthermore, in the aforesaid patent when the automatic stabilizer is governing the action of the control plane the manual lever cannot be actuated to operate said plane through the servo-motor until a switch separate from and independent of said hand lever is operated to transfer the connections of the servo-motor from said automatic stabilizer to said hand lever. On the other hand, according to my invention when the gyro stabilizer is governing the control plane, said control plane may be operated through said servo-motor by the manual lever and the gyro stabilizer automatically disconnected from the servo-motor merely by movement of said manual lever and without the necessity of first operating any separate switch.

It should be noted that the entire control of the above described system may be effected by means of a single operating lever. In fact the control may easily and readily be effected with one hand. The system as outlined is susceptible to various modifications. Thus instead of employing a wind driven servo-motor, a plurality of reversible electric motors may be employed. Furthermore instead of controlling the servo-motors directly from the gyro contacts and the control handle contacts the control may be effected through relays. These changes are embodied in the system illustrated in Fig. 8.

A pair of reversible electric motors 4ª and 4ᵇ are employed instead of the servo-motor 4 shown in Fig. 1. The shaft 136 of the motor 4ª has secured thereto the drum 38 and a worm 150. The latter meshes with the gear 45 and is preferably of such pitch that it cannot be driven by said gear. Similar mechanism 136' and 150', etc., is provided for motor 4ᵇ. This construction renders it unnecessary to employ the brake mechanism 65, 65' etc. employed in the form of the invention illustrated in Fig. 1. The coils of relays 139, 140, 139' and 140' are substituted for the coils 39, 40, 39' and 40' of Fig. 1. The front contacts of all of these relays are connected to each other and to one terminal of the generator 50. The back contacts of relays 139 and 140 are connected to each other and to one of the field terminals of motor 4ª and the back contacts of relays 139' and 140' are connected to each other and to one terminal of the field of the motor 4ᵇ. The other field terminals of motors 4ª and 4ᵇ are connected to each other and to line wire 57. The armature of motor 4ª is connected across the armatures of relays 139, 140 and the armature of motor 4ᵇ is similarly connected across the armatures of relays 139', 140'.

Figure 8:
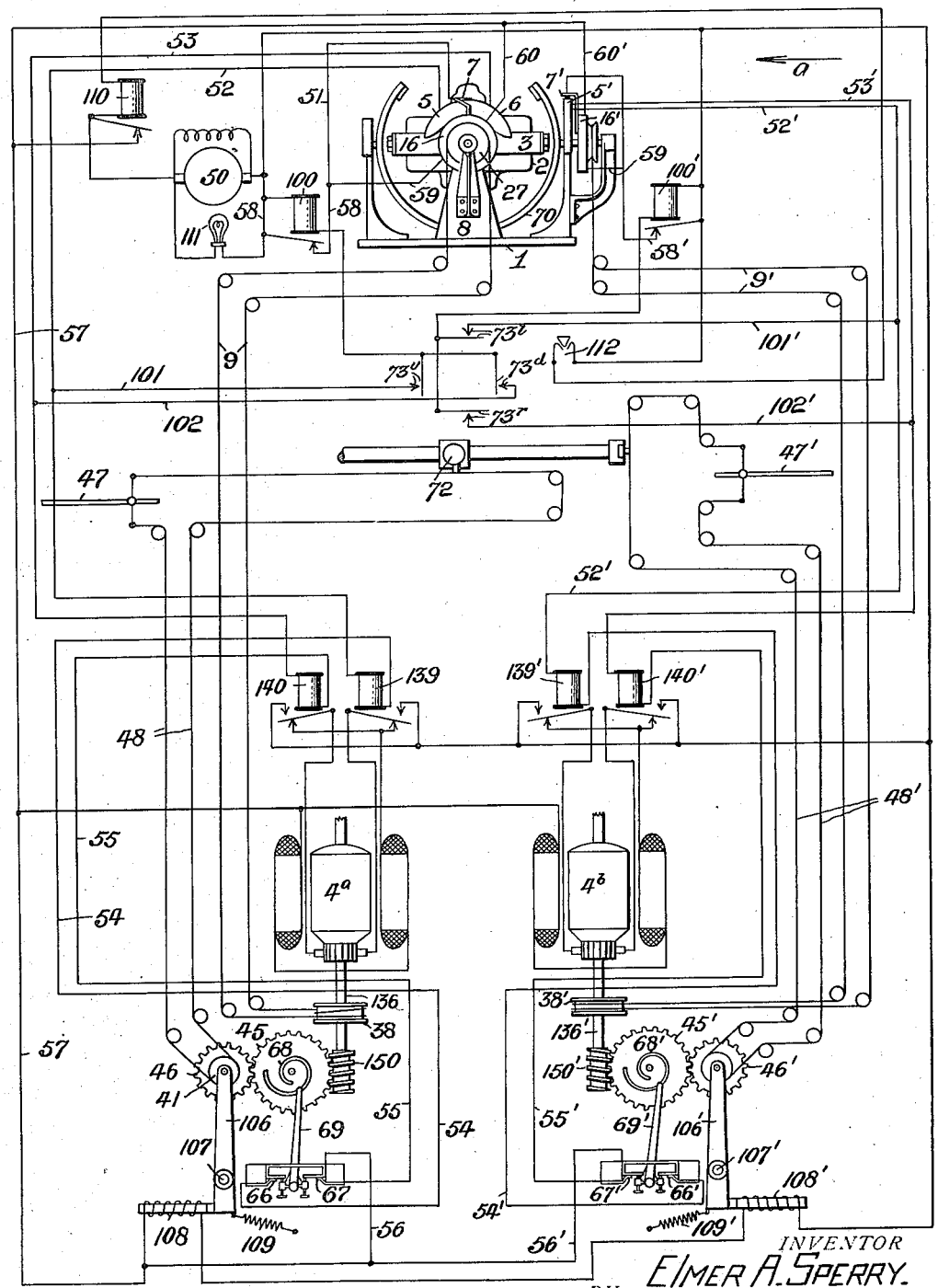
Fig. 8 is a view similar to Fig. 1 but illustrative of certain modifications.

Except for the differences above described the system illustrated in Fig. 8 is substantially identical to that illustrated in Fig. 1 similar parts being designated by the same reference numerals. It is thought that the operation of the system shown in Fig. 8 will be clearly understood in view of the description in connection with Fig. 1. I wish to point out, however, that in Fig. 8 the generator 50 not only supplies energy to control the servo motors 4ª and 4ᵇ but also supplies the motive or propulsion fluid thereto.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:—
1. In an aeroplane control system, a plurality of control planes for governing the position of the aeroplane about at least two axes, power means for actuating said planes, a manually operable member for calling said power means into action to cause the aeroplane to turn about any one of said axes and means for actuating said planes directly from said member.

2. The combination with a control plane of an aircraft, of a servo-motor for operating said control plane, means automatically controlling said servo-motor to stabilize the aircraft about an axis, a manually operable member connected to said servo-motor to cause turning of said aircraft through said servo-motor and means controlled by said member for rendering said first named means ineffective so long as said member is manually actuated.

3. The combination with a control plane of an aircraft, of a servo-motor for operating said control plane, means automatically controlling said servo-motor to stabilize the aircraft about an axis, a manually operable member connected to said servo-motor to cause turning of said aircraft, a follow-up connection between said means and plane and means controlled by said member for rendering said first named means ineffective to control said servo-motor and for breaking said follow-up connection.

4. In an aeroplane control system, a plurality of control planes for governing the position of the aeroplane about at least two axes, power means for actuating said planes, a control device, a connection between said control device and power means, follow-up connections between said planes and control device, a manually operable member for controlling said power means to turn the aeroplane about at least two axes and means called into action by manual operation of said member for breaking said follow-up connections.

5. In an aeroplane control system, a plurality of control planes for governing the position of the aeroplane about at least two axes, a control lever directly connected to said planes, means comprising a control device for stabilizing the aeroplane, follow-up connections between said planes and control device and means called into action by manual operation of said lever for breaking said follow-up connections.

6. The combination with a control plane of an aircraft, of a servo-motor for operating said control plane, means automatically controlling said servo-motor to stabilize the aircraft about an axis, a manually operable member connected to said servo-motor to cause turning of said aircraft, means controlled by said member for rendering said stabilizing means ineffective so long as said member is manually actuated and manually controlled means for actuating said plane directly.

7. The combination with a control plane of an aircraft, of a servo-motor for operating said control plane, means automatically controlling said servo-motor to stabilize the aircraft about an axis, a manually operable member connected to said servo-motor to cause turning of said aircraft, connections between said member and plane for operating the latter directly and means controlled by said member for rendering said stabilizing means ineffective so long as said member is manually actuated.

8. An aeroplane control system comprising lateral and longitudinal control planes, a manually operable member connected to said planes for operating either or both of the latter, power means controlled by said member for actuating either or both of said planes and means comprising a pendulous device for controlling said power means to stabilize the aeroplane.

9. In combination, an aircraft steering plane, a servo-motor connected to said plane for operating the same, a pendulous device for controlling said servo-motor, follow-up connections between said plane and device and means for breaking the connections between said servo-motor and plane and for breaking said follow-up connections.

10. In combination, an aircraft steering plane, a lever connected to said plane for operating the same, a servo-motor connected to said plane, means connected with said lever for operating said plane through said servo-motor, a control member carried by said lever and means for rendering said lever ineffective to control said servo-motor on operation of said control member.

11. The combination with a control plane of an aircraft, of a servo-motor for operating said control plane, means automatically controlling said servo-motor to stabilize the aircraft about an axis, a manually operable member, and means controlled by said member for actuating said servo-motor and for simultaneously throwing out said automatic control.

12. The combination with a control plane of an air-craft, of a servo-motor comprising a member adapted to be continuously driven and a second member adapted to be connected to and disconnected from the first mentioned member, said second member being connected to said plane, a source of energy connected to said servo-motor, and means for automatically breaking the connection between said second member and said plane on failure of said source.

13. The combination with a control plane of an air-craft, of a manually controlled servo-motor comprising a member adapted to be continuously driven and a second member connected to said plane and adapted to be driven by said first mentioned member, a source of energy connected to said servo-motor, and means for automatically breaking the connection between said second member and said plane on failure of said source.

14. The combination with a control plane of an air-craft of a servo-motor comprising a driving element and a second element connected to said plane, and adapted to be connected to said driving element, a pendulous device for controlling said servo-motor, a source of energy connected to said servo-motor, and means for automatically breaking the connection between said second element and said plane on failure of said source.

15. In combination, an aircraft steering plane, a servo-motor comprising a driving element and a second element adapted to be connected thereto, said second element being connected to said plane, a source of energy connected to said servo-motor, means for automatically breaking the connection between said second element and said plane on failure of said source, and alternative means for manually actuating said plane.

16. In an aeroplane control system a plurality of control planes for governing the position of the aeroplane about at least two axes, power means for actuating said planes, means automatically controlling said power means to stabilize the aeroplane about said axes, a manually operable member for controlling said power means to govern the movements of said aeroplane about said axes and means brought into action by manual operation of said member for rendering said automatic means ineffective to control said power means.

17. The combination with a control plane of an air-craft, of a servo-motor connected to said plane to cause turning of said craft, stabilizing means for controlling the operation of said servo-motor, and other means for bringing said servo-motor into action and simultaneously rendering said stabilizing means ineffective to control said servo-motor.

18. In an aircraft control system, means for automatically stabilizing an aircraft about an axis, a manual control member for governing the movements of said aircraft about a plurality of axes, and means brought into action by manual operation of said member for placing the first named means out of action.

In testimony whereof I have affixed my signature.

ELMER A. SPERRY.